(12) United States Patent
Innes et al.

(10) Patent No.: US 7,268,991 B2
(45) Date of Patent: Sep. 11, 2007

(54) ELECTRICAL CIRCUIT PROTECTION SYSTEM

(75) Inventors: Emma Louise Innes, Essex (GB); Stephen Mark Iskander, Essex (GB)

(73) Assignee: E2V Technologies (UK) Limited (GB)

( * ) Notice: Subject to any disclaimer, the term of this patent is extended or adjusted under 35 U.S.C. 154(b) by 0 days.

(21) Appl. No.: 10/480,904

(22) PCT Filed: Jun. 14, 2002

(86) PCT No.: PCT/GB02/02734
§ 371 (c)(1),
(2), (4) Date: Jun. 14, 2004

(87) PCT Pub. No.: WO02/103876
PCT Pub. Date: Dec. 27, 2002

(65) Prior Publication Data
US 2004/0218333 A1 Nov. 4, 2004

(30) Foreign Application Priority Data
Jun. 15, 2001 (GB) ................................. 0114679.4

(51) Int. Cl.
*H02H 9/00* (2006.01)
(52) U.S. Cl. ....................... 361/58; 361/93.9
(58) Field of Classification Search ............ 361/93.9, 361/58, 111
See application file for complete search history.

(56) References Cited

U.S. PATENT DOCUMENTS

| | | | | |
|---|---|---|---|---|
| 2,137,433 A | * | 11/1938 | Wirz | 336/160 |
| 2,579,978 A | * | 12/1951 | Louis et al. | 252/62.62 |
| 2,665,406 A | * | 1/1954 | Carmichael | 323/310 |
| 2,891,883 A | * | 6/1959 | Howe | 148/108 |
| 3,423,710 A | * | 1/1969 | Allen | 336/155 |
| 3,628,132 A | * | 12/1971 | Fussell et al. | 324/249 |
| 4,031,457 A | * | 6/1977 | Oberbeck | 323/362 |
| 4,122,385 A | * | 10/1978 | Oberbeck | 323/362 |
| 4,695,917 A | | 9/1987 | Jackson et al. | |
| 4,760,484 A | | 7/1988 | Walker | |
| 4,803,378 A | | 2/1989 | Richardson | |
| 5,808,495 A | | 9/1998 | Yoshihara et al. | |
| 6,066,901 A | * | 5/2000 | Burkhart et al. | 307/106 |

* cited by examiner

Primary Examiner—Ronald W. Leja
(74) Attorney, Agent, or Firm—Venable, LLP; Robert Kinberg; Jeffri A. Kaminski

(57) ABSTRACT

A system to protect electrical circuits from rapid changes of voltage associated with a fault in an electrical load comprises an inductor placed in series between a drive circuit and load. The inductor is designed to be inefficient or lossy when the inductor core is magnetised. Magnetisation of the core only occurs when a rapid change in voltage is applied across the inductor coils. Because the inductor is inefficient, the induced impedance in the inductor increases rapidly during a fault event. The overall impedance of the circuit increases rapidly and the rapid change in voltage is dissipated at a rate associated with the CR constant of the circuit.

9 Claims, 2 Drawing Sheets

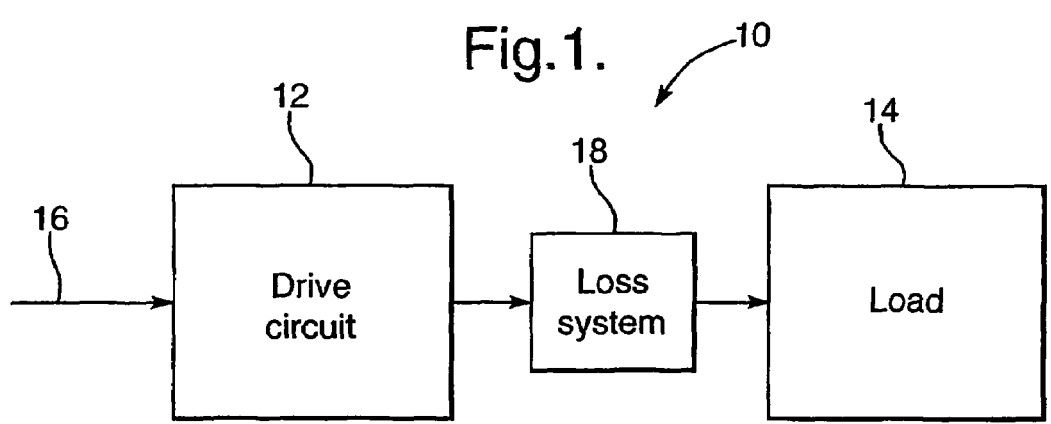
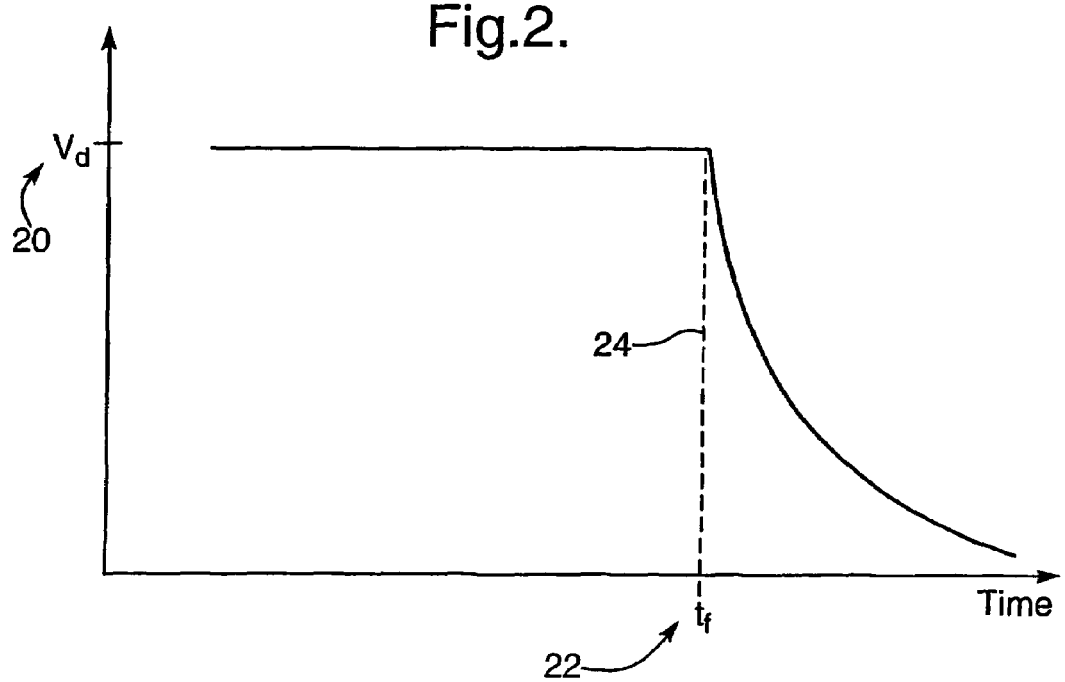

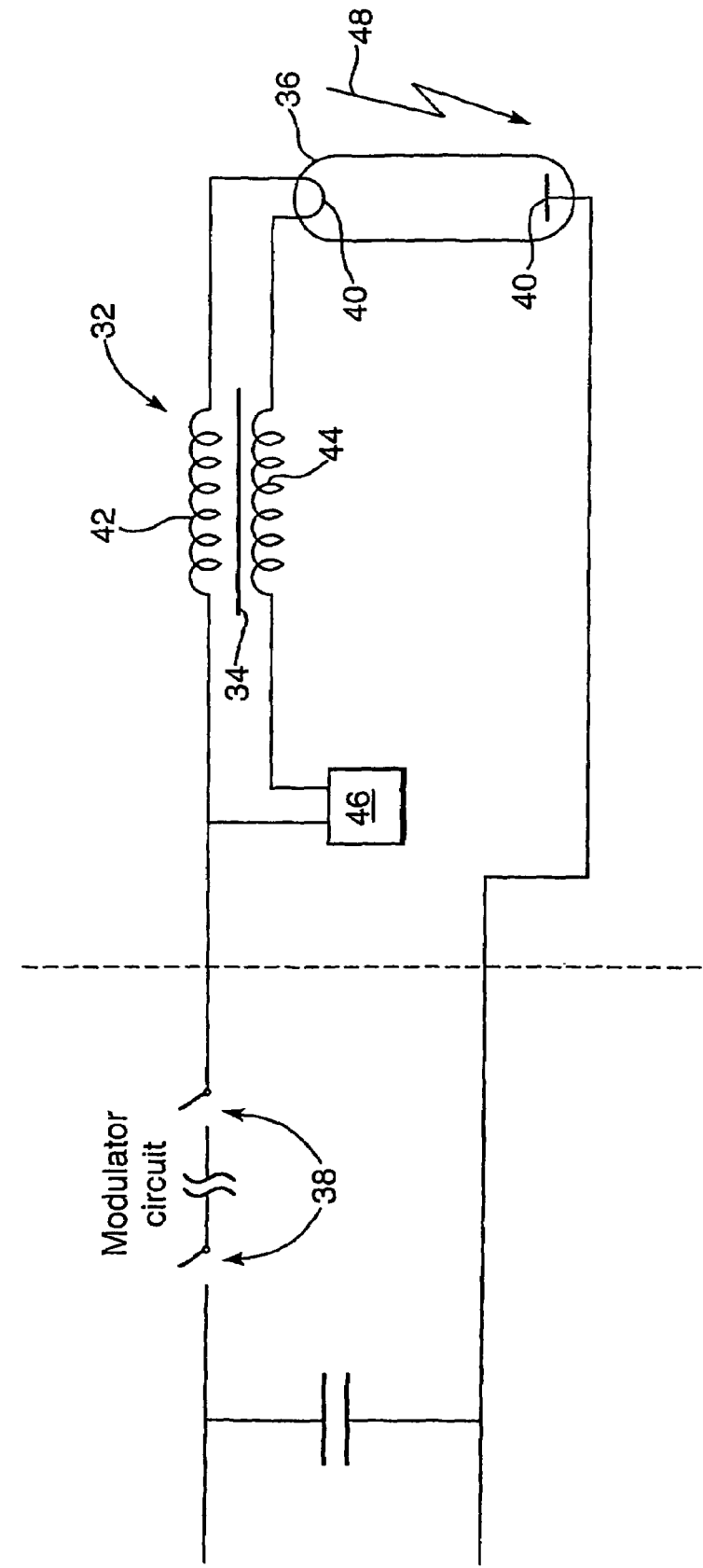

ELECTRICAL CIRCUIT PROTECTION SYSTEM

FIELD OF THE INVENTION

This invention relates to a system for protecting electrical circuits, for example, high voltage circuits, when voltage breakdown occurs in the load on the circuit.

BACKGROUND OF THE INVENTION

It is often necessary to provide protection to relatively sensitive circuits used to drive a load in, for example, high voltage applications. The load in such a system may suffer a voltage breakdown that results in a rapid change in voltage across the drive circuits of the load. Such a rapid change in voltage causes damage to components in the drive circuitry.

Our published applications GB-A-2356752 and GB-A-2356753 relate, respectively, to a low impedance power supply for a magnetron, and to a transmission line trigger arrangement for switching modules. It is desirable to protect the modulator switches in a system such as that described from any potentially damaging rapid voltage changes that may occur should the magnetron fail.

SUMMARY OF THE INVENTION

The present invention aims to provide a system that protects circuits from rapid changes of voltage, and in its broadest form, reduces the rate of voltage drop across a circuit by dissipating the energy of the rapid change.

More specifically there is provided a safety system in an electric circuit for dissipating relatively rapid changes in energy in the circuit caused by a fault, comprising a variable impedance in the form of an inductor comprising a coil of conductive material and a core having a relatively low impedance when the electric circuit operates normally and a relatively high impedance when the fault on the electrical circuit occurs, the high impedance R being caused by rapid magnetization of the core.

A system embodying the present invention has the advantage of introducing a significant impedance in the circuit if the load suffers voltage breakdown, or fails in a manner that results in a rapid change of potential across the load. The rapid change in energy associated with the failure is controlled since the impedance and circuit capacitance act to discharge the change of energy at a controlled rate associated with the CR constant of the circuits. This controlled rate is much slower than the rate of change of voltage in the circuit caused by a fault in the circuit.

BRIEF DESCRIPTION OF THE FIGURES

Embodiments of the present invention will now be described, by way of example, and with reference to the drawings in which:

FIG. 1 is a block diagram of an embodiment of the present invention;

FIG. 2 is a graph representing the drop in voltage that occurs across a drive circuit in a circuit with a protection system embodying the present invention; and FIG. 3 is a circuit diagram of a circuit embodying the present invention.

DETAILED DESCRIPTION OF THE INVENTION

Referring to FIG. 1, a system 10 embodying the present invention comprises drive circuitry 12 for driving a load 14. The drive circuit is supplied with a voltage 16 from a suitable power source, not shown. A loss system 18 is provided in series between drive circuit 12 and load 14. The loss system is designed so that it only introduces a significant impedance when a fault in the load causes, for example, voltage breakdown in the load. The system should not affect the signal from the drive circuit to the load during normal operation of the load.

In a practical application of the system 10, the drive circuit is a high voltage trigger operating in the region of 50 kV. The circuit drives a pulse magnetron load. During normal operation, the trigger circuit provides a pulse to the magnetron which has a typical rise time in the region of 200 ns. Likewise, the falling edge of the magnetron drive pulse has a fall time in the region of 200 ns.

If the magnetron fails and, for example, an arc is discharged between the magnetron cathode and anode, the potential across the drive circuit can typically fall to ground within 4 ns. The rate of change of potential when the fault occurs is unknown and random in its nature. However, the rate is very much quicker than normal operational pulse rise and fall times. Such a sharp decrease in potential can a cause catastrophic damage to the modulator circuit components.

Referring to FIG. 2, a voltage $V_d$ 20 is applied to a magnetron. The voltage is applied through a safety system embodying the present invention. At time $t_f$ a failure occurs in the load. Such a failure would normally result in a rapid change in voltage across the load and hence the drive circuit of the load. Such a rapid change is illustrated by dotted line 24 in FIG. 2. However, the safety system serves to dissipate the rapid rate of change in the voltage caused by the fault in a manageable manner. By manageable manner we mean that the rapid rise or fall in energy is dissipated and extended over a longer period in which safety systems are able to act and, if necessary, close down the circuit to prevent any damage that may otherwise have been sustained.

Referring to FIG. 3, a loss system 30 embodying the present invention comprises an inductor 32 that is designed to have high impedance during rapid magnetisation of the core 34. Such rapid magnetisation is experienced when a magnetron 36 fails and not during normal operation of the modulator switches 38 to the pulsed magnetron. The inductor only introduces a relatively high impedance in the circuit when, for example, arcing occurs between the magnetron anode and cathode 40.

In the FIG. 3 embodiment, the inductor 32 comprises a bifilar wound coil. The two coils 42 and 44 are both wound around the common core 34. A power supply 46 supplies power to the magnetron heater. The power supply operates at substantially the same voltage as the modulator circuit. During normal operation of the magnetron, the inductor presents little or no impedance to the circuit. The bifilar windings of the inductor do not magnetise the core because equal voltage is applied in opposite directions to the coils 42 and 44.

However, if the magnetron arcs internally 48 a voltage is applied equally across both coils in the same direction because the coil 42 is closely coupled to coil 44. The high ESR in coil 44 slows the discharge of the capacitance inherent in the modulator circuit. The impedance R induced in the inductor by the rapid magnetisation of its core acts together with the capacitance of the circuit to discharge the energy of the pulse at a rate equivalent to the CR constant of the whole circuit.

The high impedance is achieved by designing the inductor to be inefficient or lossy at relatively rapid changes of voltage. A poor inductor core material is inserted inside the coils so that large eddy currents are induced in the core during magnetisation of the core. A suitable material for the core is nickel foil. Ferrite beads placed over the wire of the inductor coil may also be effective.

Preferably, the inductor is designed to prevent ringing in the circuit during the normal operation and failure events. The bifilar arrangement provides an inductor in which eddy currents induced in the core are relatively low during normal operation of the circuit.

Preferably, the inductor core is designed to be inefficient, and large eddy currents are induced in the core when the core is magnetised. As a result, the impedance of the inductor is large during rapid magnetisation of the core. So, when a fault occurs in the magnetron, the modulator circuit will see a pulse of energy caused by the faulty discharge but with an extended, or stretched fall time. The inductor acts to stretch, or blunt, the rapid change of energy associated with a fault discharge in the magnetron tube. The fall time of the 'blunted' pulse will be proportional to the CR constant of the circuit, where C is the overall capacitance of the circuit and a large proportion of R is associated with the induced impedance of the inefficient inductor safety system during a failure event. Such a safety system may be termed a 'magnetic blunter'.

Furthermore, if the bifilar winding in the inductor is realised with a coaxial cable, the capacitance associated with the coaxial elements in the cable has advantageous effects. The elements in the cable are electrically close to one another increasing the overall capacitance of the circuit.

In other embodiments, the inductor can be placed in another position in the circuit. Depending on its position, it may be appropriate for the inductor to have a single winding.

The inductor should be designed so that when a fault occurs the rapid rate of charge of energy is smoothly dissipated. There should be no ringing the inductor when a fault occurs or during normal operation. The amount of impedance induced in the inductor during a failure event needs to be considered during the design process of such a safety system. Varying the thickness of a nickel foil core is an effective way to increase or decrease the level of induced impedance in the inductor.

Other embodiments of the invention will be appreciated by the skilled person without leaving the scope of the invention.

The invention claimed is:

1. A safety system in an electric circuit for supplying a load and for dissipating relatively rapid changes in energy in the circuit caused by a fault in the load, comprising a variable impedance comprising a coil of conductive material and a core having relatively low impedance when the electric circuit operates normally and a relatively high impedance when the fault on the electrical circuit occurs, wherein the core comprises a poor inductive core material, magnetization of the core faster than about 200 ns causing said relatively high impedance due to relatively large eddy currents introduced in the core, whereby the impedance is lossy at relatively rapidly changes of voltage.

2. A safety system according to claim 1, wherein the variable impedance is an inductor.

3. A safety system according to claim 2, wherein the core comprises ferrite material.

4. A safety system according to claim 2, wherein the core is nickel foil.

5. A safety system according to claim 2, further comprising:
a drive circuit, wherein the inductor is in series between the drive circuit and the load.

6. A safety system according to claim 2, wherein the inductor comprises a bifilar wound coil.

7. A safety system according to claim 6, wherein a first wire of the bifilar coil conducts a current to the load and a second wire of the bifilar coil conducts a current from the load during normal operation of the circuit, whereby the impedance of the inductor is low.

8. A safety system according to claim 7, wherein a voltage is applied in the same direction across the first and second wires of the bifilar coil when a fault in the load occurs, whereby the relatively large eddy currents are induced in the core.

9. A safety system in an electric circuit for supplying a load and for dissipating relatively rapid changes in energy in the circuit caused by a fault in the load, comprising a variable impedance comprising a coil of conductive material and a core composed of a poor inductive core material, said core having relatively low impedance when the electric circuit operates normally and a relatively high impedance when the fault occurs, occurrence of the fault resulting in rapid magnetization of the core being faster than about 200 ns, thereby causing the core to have said relatively high impedance.

* * * * *